(12) United States Patent
Ryan et al.

(10) Patent No.: US 7,969,893 B2
(45) Date of Patent: Jun. 28, 2011

(54) LIST-BASED ALERTING IN TRAFFIC MONITORING

(75) Inventors: Colin Ryan, Dublin (IE); Peter Reilly, Dublin (IE); Joseph Quinn, Dublin (IE); John Lynskey, Dublin (IE); Kevin Wilkie, Dublin (IE)

(73) Assignee: Fluke Corporation, Everett, WA (US)

( * ) Notice: Subject to any disclaimer, the term of this patent is extended or adjusted under 35 U.S.C. 154(b) by 144 days.

(21) Appl. No.: 12/546,082

(22) Filed: Aug. 24, 2009

(65) Prior Publication Data

US 2010/0046377 A1    Feb. 25, 2010

Related U.S. Application Data

(60) Provisional application No. 61/091,065, filed on Aug. 22, 2008.

(51) Int. Cl.
    *H04L 12/26* (2006.01)
(52) U.S. Cl. .......................... 370/241; 370/252
(58) Field of Classification Search .................. 370/252; 709/224
    See application file for complete search history.

(56) References Cited

U.S. PATENT DOCUMENTS

| | | | |
|---|---|---|---|
| 5,968,115 A * | 10/1999 | Trout ........................... | 718/107 |
| 5,974,457 A | 10/1999 | Waclawsky et al. | |
| 6,278,694 B1 | 8/2001 | Wolf et al. | |
| 6,327,677 B1 | 12/2001 | Garg et al. | |
| 6,708,212 B2 | 3/2004 | Porras et al. | |
| 6,801,940 B1 * | 10/2004 | Moran et al. .................. | 709/224 |
| 7,039,015 B1 | 5/2006 | Vallone et al. | |
| 7,206,838 B2 | 4/2007 | Boyd et al. | |
| 7,299,277 B1 * | 11/2007 | Moran et al. .................. | 709/224 |
| 7,336,613 B2 | 2/2008 | Lloyd et al. | |
| 7,337,206 B1 | 2/2008 | Wen et al. | |
| 2002/0026630 A1 * | 2/2002 | Schmidt et al. ............... | 717/103 |
| 2003/0105855 A1 | 6/2003 | Wynnyk | |
| 2005/0060295 A1 | 3/2005 | Gould et al. | |
| 2007/0140131 A1 | 6/2007 | Malloy et al. | |
| 2007/0204034 A1 | 8/2007 | Rexroad et al. | |
| 2010/0091676 A1 * | 4/2010 | Moran et al. .................. | 370/252 |

* cited by examiner

*Primary Examiner* — Thong Vu
(74) *Attorney, Agent, or Firm* — Edell, Shapiro & Finnan, LLC

(57) ABSTRACT

A technique for identifying deviations in patterns of data traffic between host devices communicating over a network involves establishing a baseline traffic distribution by categorizing data traffic during a learning period. The baseline traffic distribution includes a list of categories and a metric value and a measure of variability of the metric value for each category in the list. An observed traffic distribution is generated by categorizing data traffic during an observation period. The observed traffic distribution includes a list of categories and a metric value associated with each category in the list. An alarm is generated in response to at least one of the metric values of the categories of the observed traffic distribution deviating significantly from the corresponding metric value in the baseline traffic distribution based on a pair-wise comparison of the observed metric values with respective thresholds established for corresponding categories of the baseline traffic distribution.

20 Claims, 4 Drawing Sheets

LIST-BASED ALERTING IN TRAFFIC MONITORING

CROSS REFERENCE TO RELATED APPLICATION

This application claims priority from U.S. Provisional Patent Application Ser. No. 61/091,065 entitled "List-Based Alerting in Traffic Monitoring," filed Aug. 22, 2008. The disclosure of this provisional patent application is incorporated herein by reference in its entirety.

BACKGROUND

Service providers and enterprises have historically managed their networks by collecting information about data traffic at various points in the network and generating measures of network performance which can be evaluated and used for planning, establishing compliance, troubleshooting, and taking corrective action. Data relating to performance may be aggregated and presented according to certain time frames, applications, sites, devices (e.g., by host), and/or sessions between specific devices to provide the network administrator with insight into the nature and source of problems.

One aspect of network performance management is the capability to generate alerts or alarms when problem conditions develop. Unfortunately, many current monitoring systems and techniques provide information at a relatively high level and are not capable of detecting problems that become evident only by analyzing data traffic at a more granular level. It would be desirable to enhance network monitoring capabilities by providing visibility into patterns of operation and usage within networks that reveal information about individual hosts and applications.

SUMMARY

Described herein are list-based alerting techniques for identifying deviations in patterns of data traffic between host devices communicating over a network. The techniques involve establishing at least one type of baseline traffic distribution by categorizing data traffic during a learning period. The baseline traffic distribution comprises a list of categories, at least one metric value for each category in the list, and a measure of variability (e.g., standard deviation) of the metric value for each category in the list.

The baseline traffic distribution can be used as a basis for evaluating current or "observed" data traffic.

An observed traffic distribution is generated by categorizing data traffic during an observation period. The observed traffic distribution comprises a list of categories and a metric value associated with each category in the list. A determination is made as to whether the observed traffic distribution deviates significantly from the baseline traffic distribution by pair-wise comparing the metric values of the categories of the observed traffic distributions with respective thresholds established for corresponding categories of the baseline traffic distribution. The thresholds are computed as a function of the metric values and the measures of variability in the baseline traffic distributions. An alarm is generated in response to at least one of the metric values of the categories of the observed traffic distribution being outside a respective threshold.

A plurality of different baseline and observed traffic distributions can be generated by categorizing the data traffic in different ways. For example, the data traffic can be categorized according to the different applications associated with observed flow records, different source addresses, and different destination addresses. For each different type of traffic distribution, metric values can be generated that indicate bandwidth usage (e.g., bits-per-second and/or packets-per-second) for each different category.

The baseline and observed traffic distributions can also be categorized according to source addresses of hosts, and metric values are generated that indicate a measure of how many different destination addresses communicated with or how many different conversations involved the host of each source address. Another type of baseline and observed traffic distributions involves categorizing according to destination addresses of hosts, wherein the metric values indicate a measure of how many different source addresses communicated with or how many different conversations involved the host of each destination address.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

List-based alerting is a technique for finding deviations from expected traffic distributions on a network by establishing an expected profile for the traffic distributions and comparing recent behavior against the expected profiles. In particular, list-based alerting can be used to send alerts in the following scenarios: when an application on a network has begun to generate more traffic than usual; when a host on a network has become the source or destination of more traffic than usual; and when a host on a network has become the originator or target of more conversations or transactions than usual.

Figure 1:
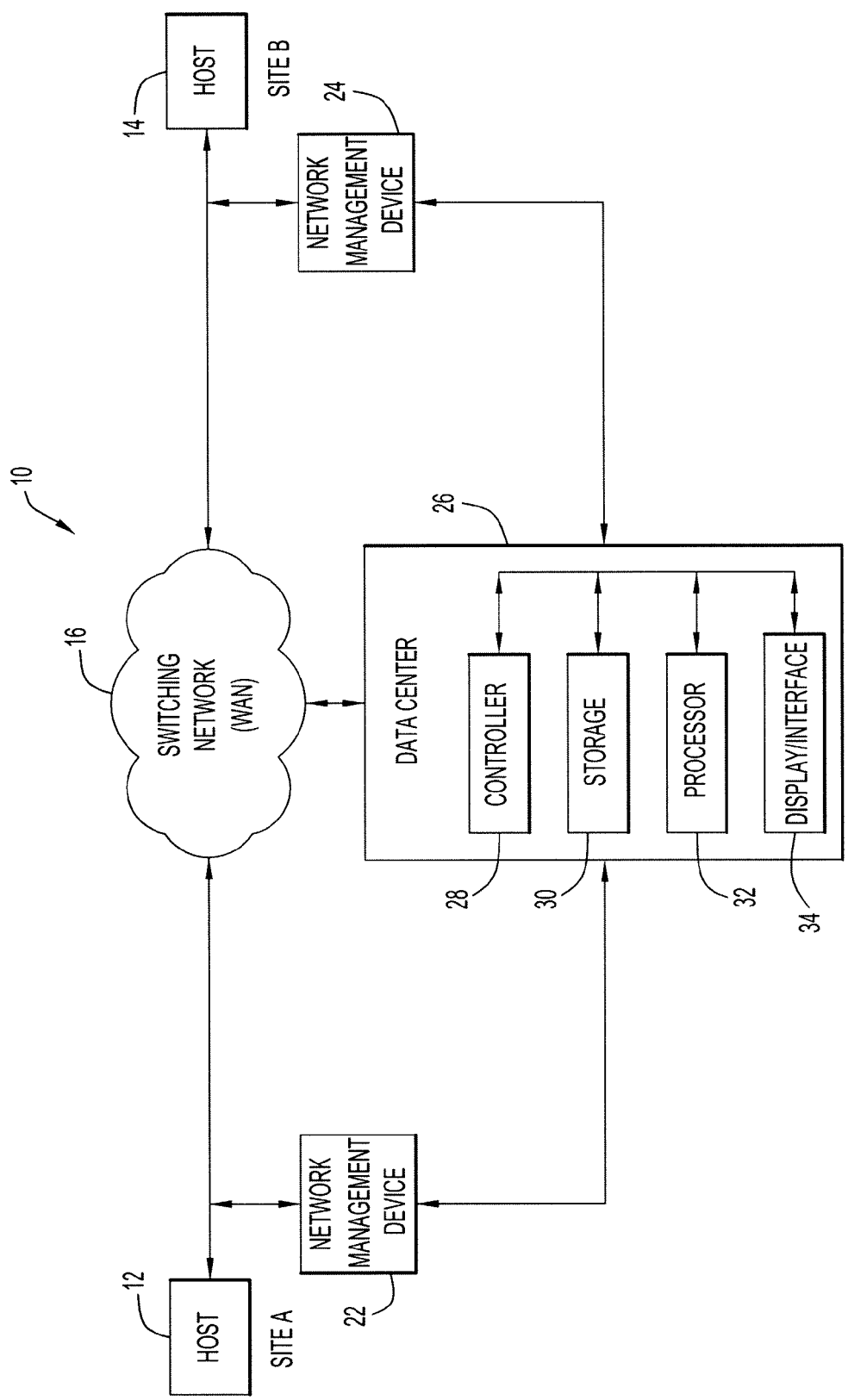
FIG. 1 is a block diagram of a network environment in which the list-based alerting techniques described herein may be employed.

The following detailed explanations of FIGS. 1-4 and of the exemplary embodiments reveal the methods and apparatus of the present invention. FIG. 1 illustrates, at a very general level, a data transmission system (communication network) that includes a network management system for monitoring performance of the network. As shown in FIG. 1, an exemplary data transmission system 10 includes a number of sites, including sites A and B, and a switching network 16 such as a wide area network (WAN) to facilitate communications between the sites. Each of sites A and B can include, for example, one or more local area networks (LANs). Routers or switches (not shown in FIG. 1) can interconnect the local site LANs ultimately to the WAN represented by the switching network cloud 16 in FIG. 1. A packet traveling across the WAN between the devices at the endpoint sites traverses one or more network paths connecting the sites. Typically, a packet's path includes several physical communication links and intermediate devices (e.g., switches and/or routers) that transmit a packet along a correct route from one site to another, and transmit the response packets back across the network in the opposite direction.

Site A may include a host 12 that communicates with another host 14 at site B over network 16. As used herein, the term "host" refers generally to computing devices or network equipment capable of communicating or exchanging information over a network and is not limited to any particular devices or equipment. In the general example shown in FIG. 1, the data transmission system 10 can include any of a number of communications line types and a variety of data communications connections. Sites A and B are each capable of transmitting and receiving data packets in various protocols utilized by the communication lines. As used herein the terms "data network," "switching network," "network," "LAN," "WAN," etc. refer to networks that carry virtually any kind of information and are not limited to any particular type of hardware, technology, protocol, application, or data (audio, video, digital data, telephony, etc.). For illustrative purposes, only two sites (A and B) and two hosts (12 and 14) are shown in FIG. 1. However, it will be understood that the data communication system can include numerous sites, each of which may have any number of hosts, wherein each site is generally connected to multiple other sites over corresponding transmission circuits within the switching network.

The network management system essentially includes a number of network management devices (NMDs) 22, 24 located throughout the network, which monitor network activity and collect network performance data and, optionally, at least one data center 26 that coordinates and controls the system, collects and processes measurement data received from the NMDs, monitors and analyzes network performance, displays network performance, and notifies network operators when performance problems are detected. Optionally, some or all of these functions can be performed by the NMDs themselves. Such a network management system can provide, for example: accurate and reliable measurement of performance metrics such as network latency, response time, jitter, data delivery ratio, and throughput; management of user performance requirements with configurable sensitivity; a context-sensitive data repository which enables the assessment and evaluation of network performance with respect to circuit, time, bandwidth, and performance requirements; and/or forecasting of potential or developing network performance problems.

As shown in FIG. 1, network management devices (NMDs) 22 and 26 are respectively disposed at sites A and B or at some point between WAN 16 and sites A and B, respectively. In general, NMDs can be placed at virtually any point in the network or at any point within an enterprise LAN (e.g., at local sites, at intermediate points between local sites and the WAN, and within the WAN itself). The placement of the NMDs depends at least in part on the portion of the system or network over which a network service provider or other party wishes to monitor performance of data traffic flow. For example, NMDs can be connected to a local router or switch such that the NMD is not in-line with the data flow path through the router between the LAN(s) and the WAN. NMDs can also be connected in-line between a local router and a customer edge router (CER), or in-line between a CER and the WAN, for example.

The NMDs can be any type of monitoring device or probe and can comprise standalone hardware/software appliances or software and/or hardware added to network equipment such as PCs, routers, switches, CSU/DSUs (channel service unit/data service unit), FRADS, voice switches, phones, etc. Software embedded in the NMDs can collect network performance data for detailed analysis and report generation relating to any of a variety of performance metrics. By way of a non-limiting example, an NMD can be a CSU/DSU that operates both as standard CSU/DSU and as a managed device capable of monitoring and inserting network management traffic; an inline device residing between a DSU and router, which monitors network traffic and inserts network management traffic; or a passive monitoring device that only monitors network traffic. The NMDs can also be "active" monitoring devices capable of inserting test packets or messages into the data traffic.

In the example shown in FIG. 1, NMDs are respectively located at both the client site A and at the server site B; however, it is also possible to have an NMD at only one of the two sites involved in a host-to-host exchange. In the arrangement shown in FIG. 1, NMD 22 at client site A is not in-line with the traffic flow between host 12 and WAN 16; however, NMD 22 could be arranged in-line with host 12. The same configuration options exist for NMD 24 at site B.

Each NMD can collect measurement data useful for computing any of a variety of performance metrics associated with operation of the network including information gleaned from individual packets traversing the path of the NMD or from flow records provided by another device such as a router or probe. The list-based alerting techniques of the present invention can be performed by an individual network management device located at any point throughout the network using only monitoring data collected locally or using monitoring data supplied by any number of other network management devices.

Data center 26 of the network management system shown in FIG. 1 receives measurement data either directly or indirectly from the NMDs, and collects and stores measurement data and processes the data to produce the various displays and reports required to monitor performance of the network and its components. Data center 26 can itself be an NMD that collects data locally and also receives data from other, remote NMDs, or data center 26 can be a back-end appliance or software that processes collected flow data without locally collecting data itself. The architecture depicted in FIG. 1 is a conceptual diagram illustrating major functional units and does not necessarily illustrate physical relationships or specific physical devices within the data center or between the data center and the NMDs. The configuration and components of the data center (which can also be components or software modules of NMDs) can take many forms and are described herein only in general terms for context. Those skilled in the art will appreciate that the techniques described herein for communicating within a network management system are applicable regardless of the particular architecture of the data center or NMDs.

Data center 26 includes a controller module 28 responsible for coordinating and controlling the network management system. For example, controller 28 may be responsible for sending instructions to the various NMDs and periodically polling the NMDs to collect measured data. A data storage capability of the data center is represented by storage module 30 for storing measurement data as well as information generated by processing measurement data, such as aggregated report data, analysis results, and historical information. Data center 26 further includes a management and processing capability represented in FIG. 1 by processor module 32, which performs various processing tasks, such as performing operations on raw measurement data to produce reports and performing analysis operations. Data center 26 further includes a display, interface, and report capability represented by display/interface module 34, which displays performance information in a tabular or graphical manner via an interactive graphical user interface, for example, and preferably includes the capability to generate various performance reports. Display device 34 can be any of a wide variety of known devices, such as an LCD display whose optical state is transformed by controlling the color of light emitted by individual pixels based on input from a user (mouse, keypad, touch screen, etc.) or from a processor. For example, the display device 34 can be a graphical user interface (GUI) which allows the user to selectively control the format and content of the display.

Data center 26 may receive measurement data directly from the NMDs or may receive measurement data indirectly (e.g., the NMDs may supply measurement data to a storage device at the local site, which is subsequently supplied to the data center. Further, the data center may be located at a single site or may have components distributed throughout the network at multiple locations. For example, storage module 30 may constitute storage capabilities at a number of local sites as well as a storage capability at one or more backend processing sites. Likewise, various processing tasks, nominally represented by processor 32 in FIG. 1, may be performed by a number of different processors that carry out specific tasks and that may be distributed throughout the network. Similarly, the display/interface capability may allow access to performance information via interfaces at a number of sites or via a web-based interface accessible to authorized customers or service provider personnel.

The network management system described herein can be embodied in a visual performance management product, including an application performance appliance (APA). It will be appreciated that the operations and methodologies described herein can be carried out by executing instructions stored on a computer readable medium (i.e., software) on a processor or processors located within the network management system (e.g., within an NMD, data center, and/or one or more separate computing devices or processors). As used herein, the term "computer readable medium" refers to tangible media (e.g., memory or storage devices).

In general, communication over network 16 involves a bidirectional exchange of data (e.g., packets) between hosts 12 and 14. Networking protocols are used to carry out communications between hosts. Several networking protocols have been designed and deployed, with varying characteristics and capabilities. At the network layer, the Internet Protocol (IP) is ubiquitous and is responsible for routing packets from one end host to another. At the transport layer, the Transmission Control Protocol (TCP) and the User Datagram Protocol (UDP) are two examples of protocols that are in common use today. Various other networking protocols might also be used. A flow is an exchange of packets between a source address (e.g., host 12) and a destination address (e.g., host 14). Packets between the hosts are organized into flows by examining the source and destination addresses together with the source and destination port numbers (according to protocol) of the packet. A transaction is an individual host request followed by the destination host's response to that request. In an individual flow, there can be any number of transactions.

The list-based alerting technique described herein can be performed by an NMD or at a data center and involves analyzing data traffic by evaluating contents of packets or flow records relating to the source host, the destination host, and the application of each observed packet or flow record. For each of a number of types of alarm conditions, a list is built based on a categorization of the data that applies to the particular type of alarm, and the frequency of each category in the list is determined by maintaining a value of a metric such as the number or rate of observed occurrences that fall into each category. Using this technique, baseline traffic distributions are established over a period of time for each type of alarm, and an alarm is generated when recently observed traffic produces a metric value for a category (or categories) in the list of an alarm type that deviates significantly from the metric value of that category in the expected (baseline) traffic distribution, either because of an increase or decrease in the rate of occurrence of that category with the current data traffic. The alarm can be, for example, a visual alarm presented on a display that alerts an operator of a potential problem via a user interface.

Five types of alarms are described herein to illustrate the concept of the invention: Recognized Application; Source Addresses; Destination Addresses; Source Address Dissemination; and Destination Address Popularity. Each of these list-based alarm types are now described. It will be recognized that the techniques of the invention can be applied to other types of alarms, and the invention is not limited to only the alarm types described.

The "Recognized Applications" alarm type involves categorizing network traffic by the application to which packets pertain. Flow records are grouped by application, and the total traffic for each application is accumulated. Applications are a classification of traffic; they can be port-protocol pairs, address ranges, or flows marked by an exporting device to be of a certain application identification, for example. That is, each different application is a category within the Recognized Applications alarm type, and the category values represent one or metrics of bandwidth usage according to the applications in the list.

The "Source Addresses" alarm type monitors bandwidth usage for each of the source addresses observed. Thus, for the Source Addresses alarm type, packets or flow records are grouped by the source address, and the bits/second and/or packets/second (or other measures of bandwidth usage) transmitted by each source address are accumulated. In this case, each source address serves as a category in the list, and the category values represent one or more metrics of bandwidth usage according to the source addresses in the list.

The "Destination Address" alarm type monitors bandwidth usage for each of the destination addresses observed. Thus, for the Destination Addresses alarm type, packets or flow records are grouped by the destination address, and the bits/second and/or packets/second (or other measures of bandwidth usage) sent to each destination address are accumulated. Accordingly, each destination address serves as a category in the list, and the category values represent one or more metrics of bandwidth usage according to the destination addresses in the list.

The "Source Address Dissemination" alarm type monitors how "chatty" a host on a network is, i.e., the number of distinct hosts that a host has conversed with and/or the number of conversations the host has had with other hosts on the network. For the Source Address Dissemination alarm type, flow records are grouped by the source address, and rates of the number of distinct destination addresses and/or conversations are accumulated for each source address. Thus, the Source Address Dissemination alarm type is similar to the Source Address alarm type in that each source address serves as a category within the list. However, unlike the Source Address alarm type which monitors bandwidth usage, the category metric values for the Source Address Dissemination alarm type are essentially rates of the number of different destination addresses, destination ports, protocols, and/or conversations that are present in the flows associated with each source address.

The "Destination Address Popularity" alarm type monitors the number of distinct hosts that converse with destination hosts and/or the number of distinct conversations that involve a destination host. For the Destination Address Popularity alarm type, flow records are grouped by the destination address, and rates of the number of distinct source addresses and/or distinct conversations are accumulated for each destination address. Thus, the Destination Address Popularity alarm type is similar to the Destination Address alarm type in that each destination address serves as a category within the list. However, unlike the Destination Address alarm type which monitors bandwidth usage, the category metric values for the Destination Address Popularity alarm type are essentially rates of the number of different source addresses, source ports, protocols, and/or conversations that are present in the flows associated with each destination address.

Figure 2:
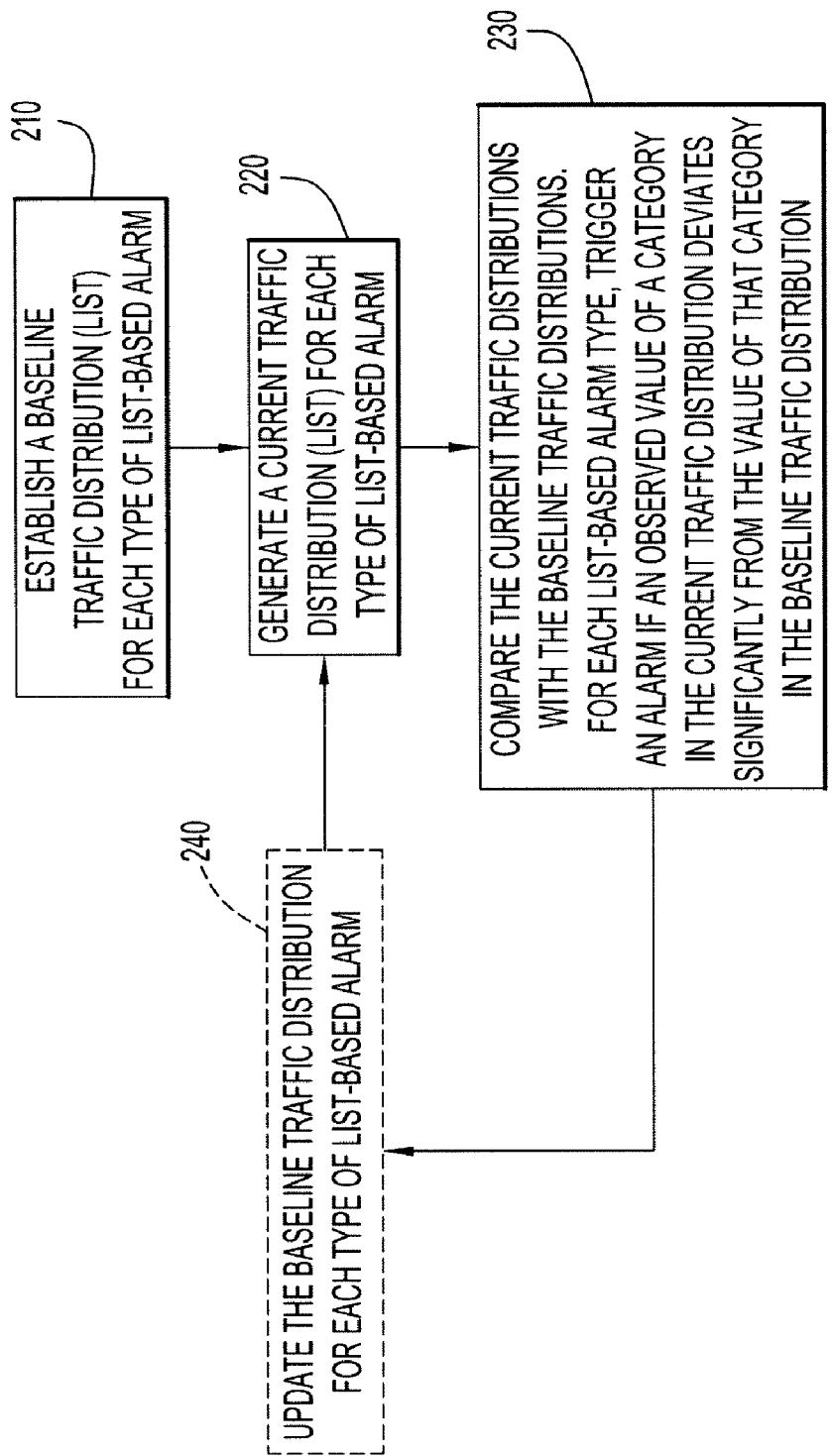
FIG. 2 is a functional flow diagram of operations performed in a network management system to implement list-based alerting.

FIG. 2 is flow diagram illustrating operations performed in a network management system to implement list-based alerting in accordance with an embodiment of the invention. Initially, a baseline traffic distribution comprising a list of category identifiers and corresponding metric values is established for each type of list-based alarm (operation 210). Operations performed to categorize network traffic to form a list for each alarm type are shown in greater detail in FIG. 3. In particular, network traffic must be broken down to make a "list" for each alarm type. This can be accomplished by a network management device (NMD) (which can be a data center NMD) obtaining information from packets or flow records (e.g., NetFlow/IPFIX traffic information) that are observed over a period of time (operation 310). As used herein the term "flow record" refers generally to information pertaining to one or more packets observed in a network and is not limited to any particular format or standard. The information in a flow record can be extracted from packets by inspecting the contents of certain fields within the packets that contain information relating to source and destination addresses, application information, protocol information, packet size, etc. An NMD can construct flow records by directly inspecting packets or can receive flow records constructed by another device. For example, the NMD can determine from each flow record: the source address of the source host transmitting a packet or group of packets; the destination address of the destination host to receive a packet or group of packets; the application to which a packet or group of packets pertains; source/destination port information; the size of one or more packets, the size of the payload of one or more packets in bits, bytes, etc.; protocol information, or any other information that may be useful for categorizing the packet or packets to which the flow record pertains or for incrementing or updating a metric value associated with a category or item in the list of one of the alarm types.

Once useful information has been extracted from the data traffic, the information is categorized to develop a traffic distribution list for each alarm type. Information within the flow records is used to determine which categories are applicable to the flow record. More specifically, in operation 320 shown in FIG. 3, for each alarm type, it is determined whether the relevant traffic information corresponds to an existing category in the list. If a packet or flow record corresponds to an existing category in the list, the category value for the identified category is updated based on the extracted information (operation 320). If the packet or flow record does not correspond to a category already in the list, a new category is established within the list and the category value is initialized (operation 340).

For example, for the Recognized Application list, traffic is categorized by the applications that make up the total observed traffic (i.e., the different applications constitute the categories), such that the traffic distribution list comprises a table with a listing of different application identifiers and corresponding metric values. Optionally, the Recognized Applications alarm type can have a traffic rate metric (e.g., measured in bits-per-seconds) and a packet rate metric in packets-per-second. These metrics are essentially rates which indicate a mean bandwidth usage rate over time. If a flow record corresponds to an application that is already in the traffic distribution list, the metric values associated with that application are updated in the table. For example, for the traffic rate metric, the number of bits-per-second is updated based on the number of bits indicated by the observed flow record. For the packet rate metric, the number of packets-per-second is updated based on the number of packets indicated by the flow record. If a flow record corresponds to an application that is not yet in the Recognized Application list, the application is added to the list and the values of the metrics associated with the application are initialized based on the information in the flow record.

In addition to storing the metric values for each application in the traffic distribution list, the table can also store a measure of variability (e.g., standard deviation or variance) of the metric values for each application. Thus, in the example in which a traffic rate metric and a packet rate metric are established, for each application in the traffic distribution list, the table can include an application identifier, the traffic rate metric value (bits/second), the standard deviation of the traffic rate metric, the packet rate metric value (packets/second), and the standard deviation of the packet rate metric. The stored metric values and their standard deviations essentially provide an indication of the expected traffic for the applications and can be used to set thresholds for determining whether later-observed traffic patterns represent a significant deviation from baseline traffic patterns.

For the Source Address list, traffic is categorized by the source addresses associated with the data traffic (i.e., the different source addresses constitute the categories), such that the traffic distribution list comprises a table with a listing of different source addresses and corresponding metric values for the different source addresses. The metrics reflect bandwidth usage on a source-address-by-source-address basis. Optionally, the Source Address alarm type can have a traffic rate metric (e.g., measured in bits-per-seconds) and/or a packet rate metric (e.g., measured in packets-per-second). Again, these metrics are rates that essentially indicate a mean usage level over time. It will be appreciated that other metrics can be used to measure bandwidth usage or rate of bandwidth usage. If a flow record corresponds to a source address that is already in the list, the metric values associated with that source address are updated in the table. For example, for the traffic rate metric, the number of bits-per-second is updated based on the number of bits indicated by the received flow record. For the packet rate metric, the number of packets-per-second is updated based on the number of packets indicated by the received flow record. If a flow record corresponds to a source address that is not yet in the Source Addresses list, the source address is added to the list and the values of the bandwidth metrics associated with the source address are initialized based on the contents of the initial flow record.

As with the Recognized Application list table, the Source Address list table can also store a measure of variability (e.g., standard deviation) which can be used along with the stored metric values to establish the expected traffic levels for comparison with later-observed traffic. In the example in which a traffic rate metric and a packet rate metric are established, for each source address in the traffic distribution list, the table can include a source address identifier, the traffic rate metric (bits/second), the standard deviation of the traffic rate metric, the packet rate metric (packets/second), and the standard deviation of the packet rate metric.

For the Destination Address list, traffic is categorized by the destination addresses associated with the observed traffic (i.e., different destination addresses constitute the categories), such that the traffic distribution list comprises a table with a listing of different destination addresses and corresponding metric values for the different destination addresses. The metric values reflect bandwidth usage on a destination-address-by-destination-address basis. Optionally, the Destination Address alarm type can have a traffic rate metric (e.g., measured in bits-per-seconds) and/or a packet rate metric (e.g., measured in packets-per-second). If a flow record corresponds to a destination address that is already in the traffic distribution list, the metric values associated with that destination address are updated in the table. For example, for the traffic rate metric, the number of bits-per-second is updated based on the number of bits indicated by the received flow record. For the packet rate metric, the number of packets-per-second is updated based on the number of packets indicated by the received flow record. If a flow record corresponds to a destination address that is not yet in the Destination Addresses list, the destination address is added to the list and the value of the bandwidth metrics associated with the destination address are initialized based on the contents of the initial flow record associated with the destination address.

As with the other alarm types, the Destination Address list table can also store a measure of variability (e.g., standard deviation) which can be used along with the stored metric values to establish the expected traffic levels for comparison with later-observed traffic. In the example in which a traffic rate metric and a packet rate metric are established, for each destination address in the list, the table can include a destination address identifier, the traffic rate metric (bits/second), the standard deviation of the traffic rate metric, the packet rate metric (packets/second), and the standard deviation of the packet rate metric.

For the Source Address Dissemination list, the observed traffic is categorized by the source addresses associated with the observed traffic (i.e., the different source addresses constitute the categories), such that the traffic distribution list comprises a table with a listing of different source addresses and corresponding metric values for the different source addresses. The metric values reflect measures of how widespread communication is on source-address-by-source-address basis. According to one embodiment, the Source Address Dissemination alarm type can have a destination-addresses-per-second metric and/or a conversations-per-second metric. The destination-addresses-per-second measures a rate of the number of different destination addresses that the source address host has communicated with, and conversations-per-second metric measures a rate of the number of "conversations" the source address host has conducted or initiated with other hosts (e.g., the number of distinct ports or flows involving the source address host). These rates essentially represent mean "dissemination" rates for the source addresses. The invention is not limited to these particular metrics, and other measures of how many or the rate of distinct communication events each source address has participated in or how widespread communication is with each source address can be used.

When a flow record is associated with a source address in the traffic distribution list, a further analysis is made to determine whether or not the destination address and/or conversation to which the flow record pertains have already been accounted for in the metric values. If so, the flow record does not reflect a new or different destination address or conversation, and the information in the flow record is not used to update the metric values associated with the source address. If the flow record indicates a destination address or conversation that has not yet been accounted for in the existing metric values, then the flow record relates to a new destination address or conversation, and the metric values associated with the source address are updated to reflect the information in the flow record. If a flow record corresponds to a source address that is not yet in the Source Address Dissemination list, the source address is added to the list and the metric values associated with the source address are initialized.

As with the other alarm types, the Source Address Dissemination list table can also store a measure of variability (e.g., standard deviation) which can be used along with the stored metric values to establish the expected traffic levels for comparison with later-observed traffic. In the example in which a destination-addresses-per-second metric and a conversations-per-second metric are established, for each source address in the list, the table can include a source address identifier, the destination-addresses-per-second metric value, the standard deviation of the destination-addresses-per-second metric, the conversations-per-second metric value, and the standard deviation of the conversation-per-second metric.

For the Destination Address Popularity list, the observed traffic is categorized by the destination addresses associated with the observed traffic (i.e., the different destination addresses constitute the categories), such that the traffic distribution list comprises a table with a listing of different destination addresses and corresponding metric values for the different destination addresses. The metric values reflect measures of how widespread communication is on a destination-address-by-destination-address basis. According to one embodiment, the Destination Address Popularity alarm type can have a source-addresses-per-second metric and/or a conversations-per-second metric. The source-addresses-per-second metric measures a rate of the number of different source addresses that the destination address host has communicated with, and conversations-per-second metric measures a rate of the number of "conversations" the destination address host has conducted or participated in with other hosts (e.g., the number of distinct ports or flows involving the destination address host). These rates essentially represent mean "popularity" rates for the destination addresses. The invention is not limited to these particular metrics, and other measures of how many or the rate of distinct communication events each destination address has participated in or how widespread communication is with each destination address can be used.

When a flow record is associated with a destination address in the traffic distribution list, a further analysis is made to determine whether or not the source address and/or conversation to which the flow record pertains have already been accounted for in the metric values. If so, the flow record does not reflect a new or different source address or conversation, and the information in the flow record is not used to update the metric values associated with the destination address. If the flow record indicates a source address or conversation that has not yet been accounted for in the existing metric values, then the flow record relates to a new source address or conversation and the metric values associated with the destination address are updated to reflect the information in the flow record. If a flow record corresponds to a destination address that is not yet in the Destination Address Popularity list, the destination address is added to the list and the metric values associated with the destination address are initialized.

As with the other alarm types, the Destination Address Popularity list table can also store a measure of variability (e.g., standard deviation) which can be used along with the stored metric values to establish the expected traffic levels for comparison with later-observed traffic. In the example in which a source-addresses-per-second metric and a conversations-per-second metric are established, for each destination address in the traffic distribution list, the table can include a destination address identifier, the source-addresses-per-second metric value, the standard deviation of the source-addresses-per-second metric, the conversations-per-second metric value, and the standard deviation of the conversation-per-second metric.

In the traffic being analyzed, each flow record is evaluated for inclusion in the list of each of the alarm types. As will be appreciated from the foregoing, an individual packet or flow record can be accounted for in the list of more than one alarm type (e.g., it can belong to a known application, a certain source address, and a certain destination address); however, a packet can correspond to only one category within the list of any given alarm type. The same traffic can be treated with multiple alarms configured for any of the above alarm types.

Referring again to FIG. 2, the baseline traffic distributions established in operation 210 serve as baseline values that can be compared with later-observed traffic to determine whether observed traffic patterns have changed significantly from the baseline traffic patterns. The period of time during which the baseline is established is referred to as the learning period. For example, one-minute data samples can be gathered over a seven day period, yielding 10,080 samples that are used to build the traffic distribution lists and corresponding metric values. The invention is not limited to a learning period of any particular duration; however, the learning period is preferably of a sufficient length to produce traffic distributions that reflect typical, normal, or acceptable usage levels within the network and that are not greatly affected by any transient or anomalous conditions that may have occurred briefly during the learning period. As described above, the data is categorized and accumulated differently for each alarm type to develop the list of category metric values, which are stored for later comparison with observed traffic.

The baseline traffic distributions can be configured to be static or updating. A static baseline is established over an initial learning period (e.g., seven days) and is not modified or updated over time (although, optionally, new baselines can be generated from time to time). The updating baseline traffic distributions essentially use traffic samples from a sliding or rolling window of time, e.g., a sliding window of seven one-day time periods or "buckets." At 24-hour increments, the data from the oldest bucket (from seven days ago) is discarded and data from the newest one-day bucket is added to the baseline traffic distributions. A baseline moves to the available state after 24-hours and is then compared with current traffic. Of course, the baseline can be updated at any suitable interval, and a 24 period is only one example. In this manner, current traffic is compared to a more recent baseline (e.g., reflecting activity over the previous week). The option of periodically updating the baseline traffic distributions is represented in FIG. 2 by operation 240. The operation is represented in a dashed box to indicate that updating of the baseline distribution is optional, depending on whether the system is configured to have a static or updating baseline. Further, the baseline traffic distributions need not be updated prior to each comparison with current or observed data. For example, observed traffic distributions that are compared with the baseline traffic distribution may be based on snapshots of data traffic lasting only a few minutes, whereas the baseline traffic distribution may be updated less frequently, such as once a day. Thus, the baseline updates in this case would not occur after every comparison.

Figure 3:
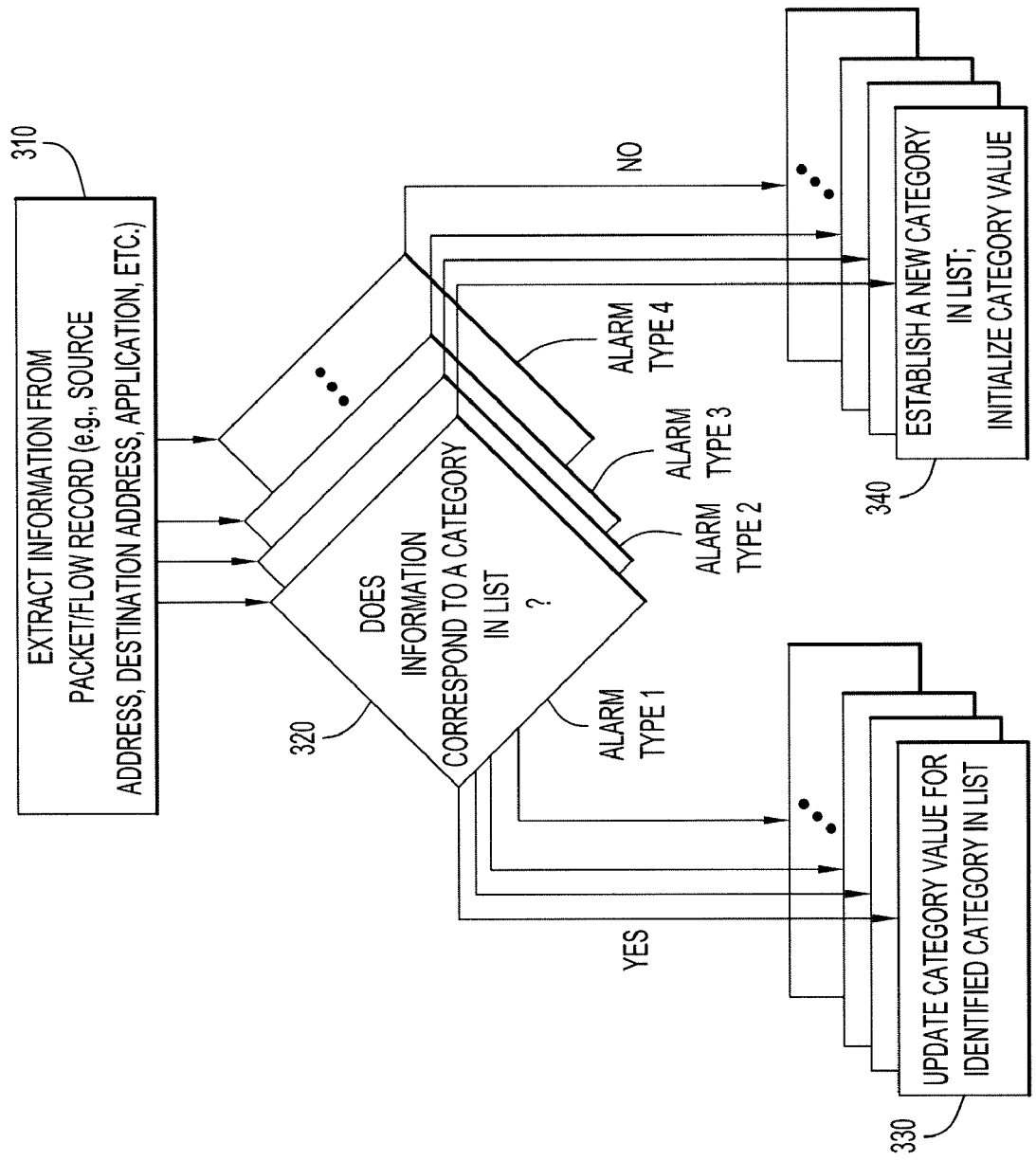
FIG. 3 is a functional flow diagram of operations performed to categorize network traffic to form list-based traffic distributions for each alarm type in order to establish baseline traffic distributions and to generate observed traffic distributions.

Once the baseline traffic distributions for the different list-based alarm types have been established, a current or "observed" traffic distribution list is generated for each list-based alarm type (operation 220 in FIG. 2). The traffic categorization mechanism employed to establish the baseline traffic distributions (i.e., the expected profile of the traffic) is also used to generate the observed traffic distributions. In particular, in the example provided, the operations shown in FIG. 3 are performed both for establishing the baseline traffic distributions and for generating the observed traffic distributions, such that for each alarm type, the observed traffic is categorized in the same manner as the baseline to yield a list of categories with their appropriate values.

In operation 230, the observed traffic distributions are compared with the baseline traffic distributions. For each list-based alarm type, an alarm is triggered if a metric value of a category in the observed traffic distribution deviates significantly from the metric value of that category in the baseline traffic distribution. In other words, for each category in a list, a pair-wise comparison is made between the metric value in current list and its corresponding metric value in the baseline list.

Typically, the observation period over which the recently observed traffic used in the comparison is collected will be shorter than the learning period used to establish the baseline. In the example previously described, the metrics are represented as rates (e.g., bit-per-second, packets-per-second, conversations-per-second, etc.). In this case, the metrics are essentially normalized to a per-second basis, such that meaningful comparison can be made between the metric values in the baseline traffic distributions and the observed traffic distributions. According to another option, counts or total values can be stored in the baseline traffic distribution lists, and the data can be normalized as necessary to make comparisons with observed data traffic collected over a shorter period of time. Another option for normalizing is to normalize both baseline and observed data relative to the overall traffic volume (e.g., each category is represented as a percentage of the total across all categories for the alarm type). It will be appreciated that any of a variety of other mechanisms can be used to normalize the baseline and/or observed traffic data.

The thresholds for triggering an alarm should be selected in a manner that minimizes the likelihood of false alarms while maximizing the likelihood of detecting significant deviations that indicate problem conditions. Thus, the extent to which the metric value for a particular category is expected to vary is taken into consideration in the comparison between the baseline and observed traffic distributions. According to one embodiment, for each category in each list-based alarm type, the threshold for triggering an alarm can be set relative to a mean and standard deviation stored in the baseline traffic distribution list for the category. As described above, for each category of each list-based alarm type, the mean (e.g., a rate)

and standard deviation can be stored for each metric being monitored. For example, a factor in the range from 0.1 to 10 can be multiplied by the baseline standard deviation and added to the baseline mean (rate) to yield a threshold. The value of the factor can be different for different alarm types and for different metrics. If the metric value associated with a category is outside this threshold, an alarm is triggered. For some alarm types and some metrics, it may be desirable to trigger an alarm in response to both increases and decreases in activity for individual categories (e.g., a source address, destination address, or an application). In this case, both an upper threshold and a lower threshold are established, and an alarm is triggered if the currently observed value is outside the thresholds (i.e., exceeds the upper threshold or is below the lower threshold).

The threshold comparison used to trigger an alarm is category-dependant and metric-dependant, and each category can have more than one metric. For example, as previously described, the Recognized Applications alarm type can have a traffic rate metric in bits/seconds and a packet rate metric of packets/second. The alarms for the Source Addresses and Destination Addresses alarm types have the same or similar metrics. The alarms for the Source Address Dissemination and Destination Address Popularity alarm types can employ, respectively, destination addresses/second and source addresses/second metrics as well as a conversations/second metric.

The metrics and their standard deviations are used in the comparison of categories. For example, for the traffic rate metric of the Recognized Applications alarm type, the baseline list includes rate and standard deviation values for the expected traffic for each application observed (e.g., http: 50 kbps, std. dev. 10 kbps; smtp: 45 kbps, std. dev. 4 kbps; etc.). The monitoring of recent traffic will have gathered the traffic for each of the observed applications to yield figures of a similar nature, i.e., bits-per-second, resulting in an appropriate comparison of values. Continuing with this example, if a threshold is set as the baseline rate plus the three times the baseline standard deviation, the threshold for the http application will be 80 kbps, and the threshold for the smtp application will be 57 kbps. If the rate of one of these applications is outside (exceeds) these levels in the current traffic being monitored, an alarm is generated.

Figure 4:
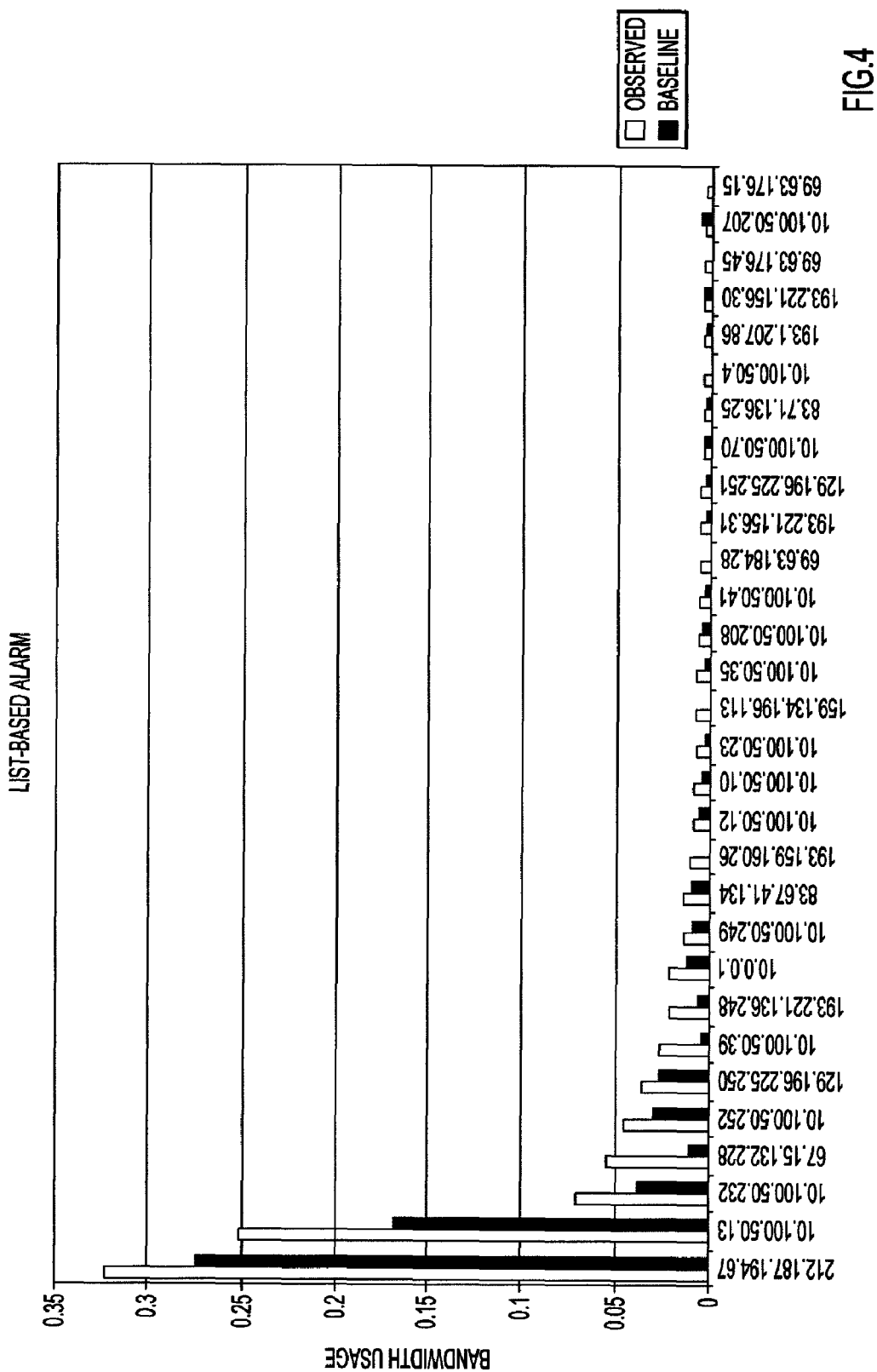
FIG. 4 is a bar graph depicting baseline and observed bandwidth usage for a list of source addresses generated for the "Source Addresses" list-based alarm.

The baseline and observed traffic distributions can be jointly displayed in a graphical or tabular manner via a graphical user interface or the like for visual comparison. One example of a graphical display is shown in FIG. 4, which is a bar graph depicting baseline and observed bandwidth usage for a list of source addresses generated for the Source Addresses list-based alarm. The source hosts on the network are plotted on the x-axis by their addresses. Each source host will have an "observed" bandwidth value from data collected over some period of time, represented by the height of a white bar in FIG. 4, and a baseline bandwidth value, represented by the height of a black bar in FIG. 4, adjacent to the observed value bar. As can be seen from the chart, in this example, the hosts 10.100.50.13 and 67.15.132.228 have deviated significantly from their expected values established in the baseline, and this comparison would yield an alert or alarm. The alert or alarm can be indicated directly on the graph with any of a variety of visual mechanisms (e.g., color variation, blinking indicator, icons, etc.). The alert or alarm can also be provided in a log report or any of a variety of other display formats.

A different graph can be displayed for each of the different list-based alarm types. The information depicted can be limited by any of a number of criteria based on user-selectable filters. For example, in an unfiltered case, every category (e.g., source address, destination address, application, etc.) in an enterprise can be listed. However, the list can be limited to certain applications, certain hosts, certain time windows, certain ports, certain sites, certain performance levels, and combinations thereof. For example, the list can be limited to only the transactions of certain sites, applications, or hosts whose performance is below a certain level for a certain performance metric.

Having described embodiments of methods and apparatus for list-based alerting in traffic monitoring, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for identifying deviations in patterns of data traffic between host devices communicating over a network, comprising:
   (a) establishing a baseline traffic distribution by categorizing data traffic during a learning period, wherein the baseline traffic distribution comprises a list of categories, a metric value for each category in the list, and a measure of variability of the metric value for each category in the list;
   (b) generating an observed traffic distribution by categorizing data traffic during an observation period, wherein the observed traffic distribution comprises a list of categories and a metric value associated with each category in the list;
   (c) determining whether the observed traffic distribution deviates significantly from the baseline traffic distribution by pair-wise comparing the metric values of the categories of the observed traffic distribution with respective thresholds established for corresponding categories of the baseline traffic distribution, wherein the thresholds are a computed as a function of the metric values and the measures of variability in the baseline traffic distribution; and
   (d) generating an alarm in response to at least one of the metric values of the categories of the observed traffic distribution being outside a respective threshold.

2. The method of claim 1, wherein:
   (a) comprises establishing a plurality of different baseline traffic distributions by categorizing data traffic in a plurality of different ways during the learning period, wherein each of the baseline traffic distributions comprises a list of categories, a metric value for each category in the list, and a measure of variability of the metric value for each category in the list;
   (b) comprises generating a plurality of different observed traffic distributions that respectively correspond to the different baseline traffic distributions, by categorizing data traffic in the plurality of different ways during the observation period, wherein each of the observed traffic distributions comprises a list of categories and a metric value associated with each category in the list;
   (c) comprises determining whether the observed traffic distributions deviate significantly from the respective baseline traffic distributions by pair-wise comparing the metric values of the categories of the observed traffic distributions with respective thresholds established for corresponding categories of the respective baseline traffic distributions, wherein the thresholds are a function of the metric values and the measures of variability in the baseline traffic distributions; and (d) comprises generating an alarm in response to at least one of the metric values of the categories of the observed traffic distributions being outside a respective threshold.

3. The method of claim 1, wherein the alarm is displayed on a display device.

4. The method of claim 1, further comprising:
controlling a display device to display a visual data presentation that includes a representation of the metric value from the baseline traffic distribution and the metric value from the observed traffic distribution on a category-by-category basis for a plurality of the categories.

5. The method of claim 4, wherein the display comprises a bar graph.

6. The method of claim 1, wherein:
(a) comprises establishing the baseline traffic distribution to include a plurality of metric values for each category in the list and a measure of variability for each of the metric values for each category in the list; and
(b) comprises generating the observed traffic distribution to include a plurality of metric values associated with each category in the list.

7. The method of claim 1, wherein the baseline traffic distribution is periodically updated.

8. The method of claim 1, wherein the baseline and observed traffic distributions are categorized according to at least one of: application types, source addresses, and destination addresses, and wherein the metric values indicate bandwidth usage on at least one of: an application-by-application basis, a source-address-by-source-address basis, and a destination-address-by-destination-address basis.

9. The method of claim 1, wherein:
the baseline and observed traffic distributions are categorized according to source addresses of hosts, and the metric values indicate a measure of how many different destination addresses communicated with or how many different conversations involved the host of each source address.

10. The method of claim 1, wherein:
the baseline and observed traffic distributions are categorized according to destination addresses of hosts, and the metric values indicate a measure of how many different source addresses communicated with or how many different conversations involved the host of each destination address.

11. A system for identifying deviations in patterns of data traffic between host devices communicating over a network, comprising:
a network management device configured to monitor data traffic between host devices communicating over the network;
a processor configured to receive data traffic information from the network management device and configured to:
establish a baseline traffic distribution by categorizing data traffic during a learning period, wherein the baseline traffic distribution comprises a list of categories, a metric value for each category in the list, and a measure of variability of the metric value for each category in the list;
generate an observed traffic distribution by categorizing data traffic during an observation period, wherein the observed traffic distribution comprises a list of categories and a metric value associated with each category in the list; and
determine whether the observed traffic distribution deviates significantly from the baseline traffic distribution by pair-wise comparing the metric values of the categories of the observed traffic distribution with respective thresholds established for corresponding categories of the baseline traffic distribution, wherein the thresholds are a function of the metric values and the measures of variability in the baseline traffic distribution; and
a display device configured to display an alarm in response to at least one of the metric values of the categories of the observed traffic distribution being outside a respective threshold.

12. The system of claim 11, wherein the processor is further configured to:
establish a plurality of different baseline traffic distributions by categorizing data traffic in a plurality of different ways during the learning period, wherein each of the baseline traffic distributions comprises a list of categories, a metric value for each category in the list, and a measure of variability of the metric value for each category in the list;
generate a plurality of different observed traffic distributions that respectively correspond to the different baseline traffic distributions, by categorizing data traffic in the plurality of different ways during the observation period, wherein each of the observed traffic distributions comprises a list of categories and a metric value associated with each category in the list; and
determine whether the observed traffic distributions deviate significantly from the respective baseline traffic distributions by pair-wise comparing the metric values of the categories of the observed traffic distributions with respective thresholds established for corresponding categories of the respective baseline traffic distributions, wherein the thresholds are a function of the metric values and the measures of variability in the baseline traffic distributions.

13. The system of claim 11, wherein the display device is configured to display a visual data presentation that includes a representation of the metric value from the baseline traffic distribution and the metric value from the observed traffic distribution on a category-by-category basis for a plurality of the categories.

14. The system of claim 13, wherein the display device is configured to present the baseline and observed traffic distributions as a bar graph.

15. The system of claim 11, wherein the processor is further configured to:
establish the baseline traffic distribution to include a plurality of metric values for each category in the list and a measure of variability for each of the metric values for each category in the list; and
generate the observed traffic distribution to include a plurality of metric values associated with each category in the list.

16. The system of claim 11, wherein the processor is configured to periodically update the baseline traffic distribution.

17. The system of claim 11, wherein the processor is further configured to categorize the baseline and observed traffic distributions according to at least one of: application types, source addresses, and destination addresses, wherein the metric values indicate bandwidth usage on at least one of: an application-by-application basis; a source-address-by-source-address basis; and a destination-address-by-destination-address basis.

18. The system of claim 11, wherein the processor is further configured to categorize the baseline and observed traffic distributions according to source addresses of hosts, wherein the metric values indicate a measure of how many different destination addresses communicated with or how many different conversations involved the host of each source address.

19. The system of claim 11, wherein the processor is further configured to categorize the baseline and observed traffic distributions according to destination addresses of hosts, wherein the metric values indicate a measure of how many different source addresses communicated with or how many different conversations involved the host of each destination address.

20. A Non-transitory computer readable medium storing instructions, that when executed by a computer, cause the computer to perform functions of:
   (a) establishing a baseline traffic distribution by categorizing data traffic during a learning period, wherein the baseline traffic distribution comprises a list of categories, a metric value for each category in the list, and a measure of variability of the metric value for each category in the list;
   (b) generating an observed traffic distribution by categorizing data traffic during an observation period, wherein the observed traffic distribution comprises a list of categories and a metric value associated with each category in the list;
   (c) determining whether the observed traffic distribution deviates significantly from the baseline traffic distribution by pair-wise comparing the metric values of the categories of the observed traffic distribution with respective thresholds established for corresponding categories of the baseline traffic distribution, wherein the thresholds are computed as a function of the metric values and the measures of variability in the baseline traffic distribution; and
   (d) generating an alarm in response to at least one of the metric values of the categories of the observed traffic distribution being outside a respective threshold.

\* \* \* \* \*